United States Patent
Niimi et al.

(10) Patent No.: US 6,861,781 B2
(45) Date of Patent: Mar. 1, 2005

(54) ROTOR OF ROTARY ELECTRIC MACHINE HAVING COMMUTATOR SURFACE FACING AXIAL REAR END

(75) Inventors: Masami Niimi, Handa (JP); Tsutomu Shiga, Nukata-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/706,930

(22) Filed: Nov. 14, 2003

(65) Prior Publication Data

US 2004/0108786 A1 Jun. 10, 2004

(30) Foreign Application Priority Data

Dec. 5, 2002 (JP) .................................... 2002-353456

(51) Int. Cl.$^7$ ........................... H02K 13/04; H02K 3/04
(52) U.S. Cl. ................................. 310/233; 310/201
(58) Field of Search ................................. 310/201, 261, 310/233, 234, 237, 216, 58–60 A

(56) References Cited

U.S. PATENT DOCUMENTS

| | | | | |
|---|---|---|---|---|
| 5,508,577 A | * | 4/1996 | Shiga et al. | 310/201 |
| 5,650,683 A | * | 7/1997 | Shiga et al. | 310/201 |
| 5,739,617 A | * | 4/1998 | Katoh et al. | 310/214 |
| 5,778,512 A | * | 7/1998 | Ichikawa et al. | 29/598 |
| 5,864,193 A | * | 1/1999 | Katoh | 310/214 |
| 5,889,342 A | * | 3/1999 | Hasebe et al. | 310/54 |
| 5,994,815 A | * | 11/1999 | Takagi et al. | 310/237 |
| 6,018,209 A | * | 1/2000 | Katoh et al. | 310/270 |
| 6,510,603 B1 | * | 1/2003 | Ebihara et al. | 29/598 |

FOREIGN PATENT DOCUMENTS

| | | | | |
|---|---|---|---|---|
| JP | 7-303354 | * | 11/1995 | 310/201 |
| JP | 7-308049 | * | 11/1995 | 310/201 |
| JP | B2 2924605 | | 5/1999 | 310/201 |

* cited by examiner

Primary Examiner—Tran Nguyen
(74) Attorney, Agent, or Firm—Oliff & Berridge, PLC

(57) ABSTRACT

A rotor of a rotary electric machine such as a starter motor for cranking an internal combustion engine is substantially composed of an armature core fixed to a rotating shaft and an armature coil disposed in slots of the armature core. The armature coil is constituted by electrically connecting conductor segments. A rear end portion of each conductor segment disposed in the radial outside of the slot is bent and arranged on an axial rear surface of the armature core, thereby forming a commutator surface. The thickness of the rear end portion in the axial direction gradually increases from its radial outside toward its radial inside, and the cross-sectional area of the rear end portion is made uniform throughout its entire length.

7 Claims, 4 Drawing Sheets

FRONT SIDE ← → REAR SIDE

FRONT SIDE ⟷ REAR SIDE

… (US 6,861,781 B2)

ROTOR OF ROTARY ELECTRIC MACHINE HAVING COMMUTATOR SURFACE FACING AXIAL REAR END

CROSS-REFERENCE TO RELATED APPLICATION

This application is based upon and claims benefit of priority of Japanese Patent Application No. 2002-353456 filed on Dec. 5, 2002, the content of which is incorporated herein by reference.

BACKGROUND OF THE INVENTION

1. Field of the Invention

The present invention relates to a rotor of a rotary electric machine, the rotor having a commutator surface facing an axial rear end of the rotary machine.

2. Description of Related Art

Recently, improvement of fuel economy in an automobile vehicle is becoming an important subject in order to prevent temperature rise on the earth. For this purpose, engine improvement has been done very eagerly. It is also important to make a starter motor small in size and light in weight since the starter motor is one of major auxiliary equipment mounted on the engine. For this end, a starter motor utilizing rear end portions of conductor segments as a commutator surface has been proposed in JP-B2-2924605. According to the proposed structure, it is not necessary to provide an independent commutator. Therefore, it is possible to considerably reduce the size and weight of the starter motor. In addition, this structure eliminates a process of undercutting the commutator surface, resulting in reduction of manufacturing cost.

In the proposed structure, however, the thickness of each rear end portion of the conductor segment in the axial direction is uniformly made throughout its entire radial length while its width on the commutator surface gradually decreases from the radial outside toward the radial inside. As a result, the cross-sectional area of the rear end portion of the conductor segment gradually decreases from the radial outside toward the radial inside. Therefore, electrical resistance of an armature coil constituted by such plural conductor segments becomes high, and accordingly the output of the starter motor is somewhat sacrificed. Further, an upsetting process is required to form the conductor segment having such a rear end portion from a conductor wire. Therefore, the process of forming the conductor segment is not easy, resulting in high manufacturing cost.

SUMMARY OF THE INVENTION

The present invention has been made in view of the above-mentioned problems, and an object of the present invention is to provide an improved rotor of a rotary electric machine, an output of which is improved by reducing electrical resistance of an armature coil. Another object of the present invention is to simplify the process of manufacturing the conductor segments from a conductor wire.

A rotor of a rotary electric machine such as a starter motor for cranking an internal combustion engine is mainly composed of: an armature core fixed to a center shaft; an armature coil formed by electrically connecting plural conductor segments disposed in the armature core; and a commutator formed at an axial rear side of the armature core. The conductor segments include inner conductor segments disposed in an inner portion of slots formed in the armature core and outer conductor segments disposed in an outer portion of the slots.

Each inner conductor segment is composed of an in-slot portion disposed in the slot, and rear and front end portions bent from the in-slot portion at a right angle. Each outer conductor segment is similarly composed. The conductor segment is formed from a conductor wire having a rectangular cross-section by presswork without using an upsetting process. The rear end portions of the inner conductor segments are arranged on the axial rear surface of the armature core, and the rear end portions of the outer conductor segments are overlapped on the former with an insulator disk interposed therebetween. The rear end portions of the outer conductor segments constitute a commutator surface which brushes for supplying electric current to the armature coil slidably contact.

The thickness of the rear end portion of the outer conductor segment is gradually increased from its radial outside toward its radial inside so that a cross-sectional area of the rear end potion is kept substantially uniform throughout its entire length. In this manner, electric resistance of the armature coil can be made low, thereby attaining a high output. In addition, gravity center of the rear end portion is placed at a position closer to the rotational center, thereby reducing a centrifugal force applied to the rear end portion.

The commutator surface is slightly slanted relative to a plane perpendicular to the axial direction. Alternatively, the commutator surface may not be slanted. By slanting the commutator surface, brushes contacting the commutator surface in the axial direction can be surely held in brush holders. Through-holes may be made in the armature core in order to provide air passages for dissipating heat generated in the armature. Connecting portions formed at both axial sides of the armature core for electrically connecting the conductor segments are preferably placed at an equal radial distance from the rotational center to thereby reduce an imbalance of centrifugal force applied to both sides of the armature core.

According to the present invention, the electrical resistance of the armature coil can be made low thereby to increase the output of the rotary electric machine. The conductor segments are easily formed from a conductor wire by presswork without using an upsetting process. Other objects and features of the present invention will become more readily apparent from a better understanding of the preferred embodiment described below with reference to the following drawings.

DETAILED DESCRIPTION OF THE PREFERRED EMBODIMENT

Figure 1:
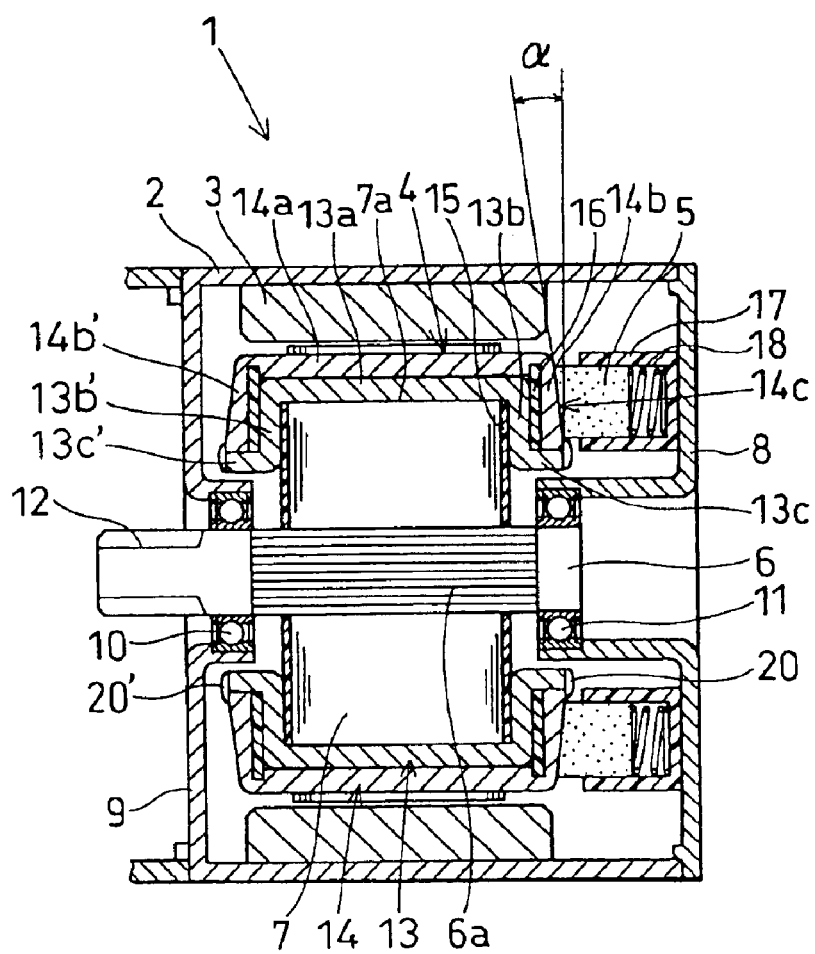
FIG. 1 is a cross-sectional view showing a starter motor including an armature according to the present invention.

A preferred embodiment of the present invention will be described with reference to the accompanying drawings. First, referring to FIG. 1, an entire structure of a rotary electric machine according to the present invention will be described. In FIG. 1, as an example of the rotary electric machine, a starter motor for cranking an internal combustion engine is shown.

The rotary electric machine 1 is substantially composed of a stator fixed to a housing formed by a yoke 2 and a rear frame 8, an armature 4 rotatably supported in the housing, and brushes 5 for supplying electric current to the armature 4. Inside the cylindrical yoke 2, plural magnetic poles (permanent magnets) 3 are disposed. The axial rear end of the cylindrical yoke 2 is closed with the rear frame 8, and the axial front end thereof is closed with a front wall 9 integrally formed with the cylindrical yoke 2.

The armature 4 is composed of an armature core 7 supported by a center shaft 6, and inner conductor segments 13 and outer conductor segments 14 disposed in slots 7a formed in the armature core 7. The center shaft 6 is rotatably supported by a bearing 10 fixed to the front wall 9 and another bearing 11 fixed to the rear frame 8. At the front side end of the center shaft 6, a sun gear 12 engaging with planetary gears of a speed reduction device (not shown) is formed. Rotational torque of the armature 4 is transmitted from the sun gear 12 to the speed reduction device.

The armature core 7 is formed by laminating thin steel plates, and the laminated steel plates are fixed to the center shaft 6 with help of serrations 6a formed on the center shaft 6. A plurality of slots 7a are formed in the armature core 7 in the vicinity of its outer periphery at a equal interval. An inner conductor segment 13 is disposed in an inner portion of each slot 7a, and an outer conductor segment 14 is disposed in an outer portion of each slot 7a. The inner conductor segments 13 are electrically connected to the outer conductor segments 14 at their respective ends, thereby forming an armature coil.

The inner conductor segment 13 is composed of an in-slot portion 13a that is disposed in the slot 7a, a rear end portion 13b positioned on the rear end surface of the armature core 7 and a front end portion 13b' positioned on the front end surface of the armature core 7, as shown in FIG. 1. At the end of the rear end portion 13b, a projected portion 13c extending in the axial direction is formed. At the end of the front end portion 13b', a projected portion 13c' is similarly formed. A disk-shaped insulator plate 15 is disposed between the rear end surface of the armature core 7 and the rear end portion 13b of the inner conductor segment 13.

Figure 2:
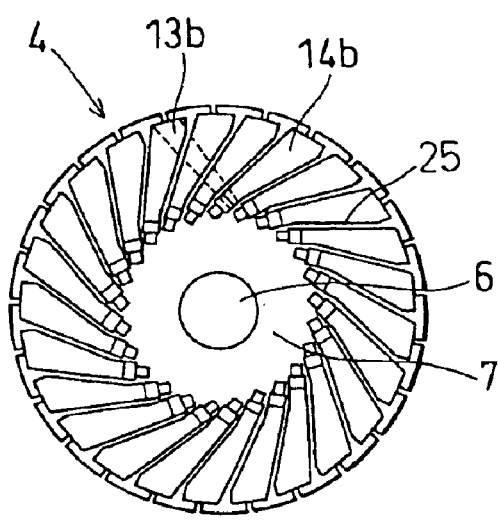
FIG. 2 is a plan view showing a commutator surface viewed from an axial rear end of an armature.

The outer conductor segment 14 is composed of an in-slot portion 14a that is disposed in the slot 7a, a rear end portion 14b positioned along the rear end surface of the armature core 7 and a front end portion 14b' positioned along the front end surface of the armature core 7. As shown in FIG. 1, the thickness of the rear end portion 14b in the axial direction gradually increases as the rear end portion 14b proceeds from the radial outside of the armature 4 toward the rotational center of the armature 4. As shown in FIG. 2, the width of the rear end portion 14b decreases as the rear end portion proceeds toward the rotational center. In this manner, a cross-sectional area of the rear end portion 14b is made substantially equal throughout its entire length. The front end portion 14b' is similarly formed as the rear end portion 14b.

A plurality of the rear end portions 14b arranged at the axial rear end of the armature core 7, as shown in FIGS. 1 and 2, constitutes a commutator surface 14c. The commutator surface 14c is slanted by a predetermined angle $\alpha°$ relative to a surface perpendicular to the rotational center. The slant angle $\alpha°$ is determined by a thickness difference of the rear end portion 14b between its outermost portion and innermost portion. An insulator plate 16 is interposed between the rear end portion 13b of the inner conductor segment 13 and the rear end portion 14b of the outer conductor segment 14.

FIG. 2 shows the commutator surface 14c viewed from the rear side of the armature 4. The rear end portions 14b of the outer conductor segments 14 are skewed relative to the radial line extending from the rotational center. The rear end portion 13b (shown by a dotted line) of the inner conductor segments 13 are skewed in a direction opposite to the skew direction of the rear end portions 14b. A gap 25 is provided between neighboring rear end portions 14b. The gap 25 is uniform throughout its length from the radial outside to the radial inside. This means that the width of the rear end portion 14b on the commutator surface 14c gradually decreases from its radial outside to its radial inside.

As shown in FIG. 1, the brushes 5 are slidably held in cylindrical brush holders 17 fixed to the rear frame 8 and are pushed against the commutator surface 14c by the springs 18 in a direction parallel to the rotational center. The surface of the brush 5 contacting the commutator surface 14c is slanted by the same slant angle $\alpha°$.

Following advantages are attained by the present invention. Since the cross-sectional area of the rear end portion 14b is made uniform in its entire length by making its thickness in the axial direction thicker at its radial inside than at its radial outside, electric resistance of the armature coil can be made lower, compared with that of the conventional armature coil. Therefore, a higher output can be obtained. Since the center of gravity of the rear end portion 14b is shifted toward the radial inside, compared with that of the conventional armature, the centrifugal force applied to the rear end portions 14b is alleviated. Therefore, the armature 4 can be rotated at a higher speed.

Further, since the commutator surface 14c is slanted relative to the surface perpendicular to the rotational center, a force component in the direction from the radial outside toward the radial inside is applied to the brush 5 pushed in the axial direction by the spring 18. The brush 5 is always pushed against an inside wall of the brush holder 17. Therefore, the brush 5 can be held more securely in the bush holder 17 so that it endures a higher vibration applied from outside.

Figure 3:
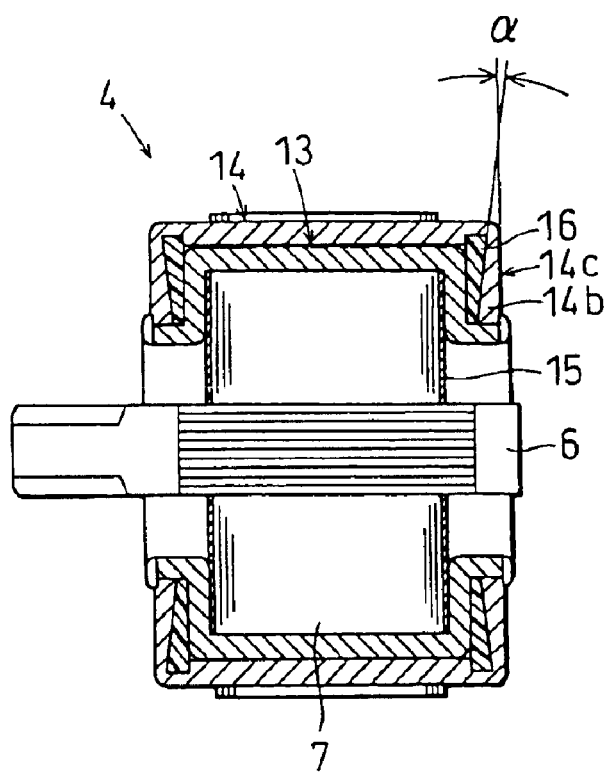
FIG. 3 is a cross-sectional view showing a modified form of an armature.

The armature 4 shown in FIG. 1 may be modified to the form shown in FIG. 3. The thickness of the rear end portion 14b is made in the same manner as described above, but the commutator surface 14c is not slanted in this modified form. To make the commutator surface 14c parallel to the plane perpendicular to the rotational center, the insulator plate 16 is made so that its thickness gradually increases from its radial inside to its radial outside. In other words, instead of slanting the commutator surface 14c, the rear surface of the insulator plate 16 is slanted by $\alpha°$. Since a centrifugal force applied to the rear end portions 14b can be partly received by the slanted surface of the insulator plate 16 in this modified structure, the armature 4 can endure a higher rotational speed.

If the rear end portion 14b of the outer conductor segment 14 is bent in the form as shown in FIG. 3, it is difficult to assemble the outer conductor segment 14 to the armature core 7. Therefore, the rear end portion 14b is opened outwardly by the angle α° before assembling, and the rear end portion 14b is bent at its correct angle after it is assembled to the armature core 7.

Figure 4A:
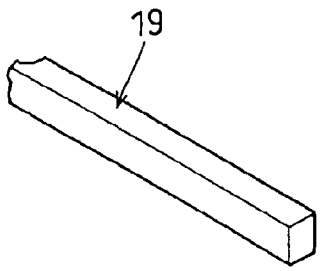
FIGS. 4A–4C are perspective views showing a process of forming a conductor segment from a conductor wire.
Figure 4B:
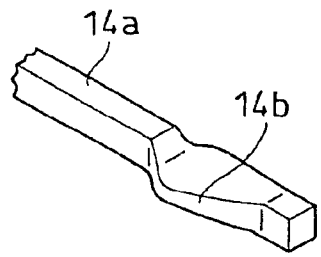
Figure 4C:
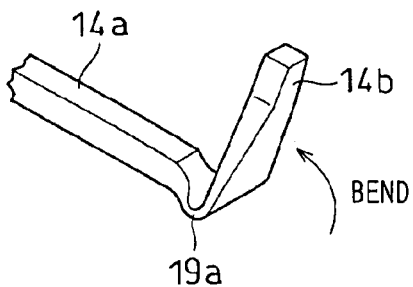

Referring to FIGS. 4A–4C, a process of forming the outer conductor segment 14 will be described. A conductor wire 19 such as a copper wire having a rectangular cross-section, shown in FIG. 4A, is used for forming the outer conductor segment 14. As shown in FIG. 4B, the rear end portion 14b is formed by pressing the conductor wire 19 with a die having a shape corresponding to the rear end portion 14b. The front end portion 14b' may be formed in the same manner, or it may be formed in a different shape. Then, as shown in FIG. 4C, the end portion 14b is bent at a portion having the smallest thickness (at a thin portion 19a). The rear end portion 14b having the tapered thickness can be formed by presswork without using an upsetting process. Therefore, the process of forming the outer conductor segment 14 can be considerably simplified, compared with a process for forming the conventional conductor segment.

Figure 5:
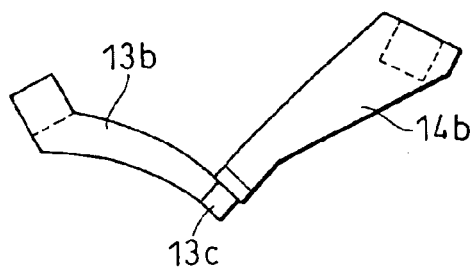
FIG. 5 is a perspective view showing a portion connecting rear end portions of an inner conductor segment and an outer conductor segment.
Figure 6:
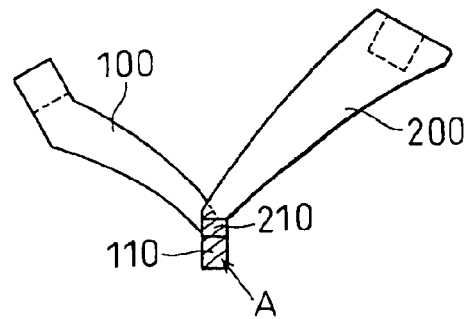
FIG. 6 is a perspective view showing a connecting portion in a conventional starter motor.

Referring to FIG. 5, the electrical connection between the rear end portion 13b of the inner conductor segment 13 and the rear end portion 14b of the outer conductor segment 14. A projected portion 13c is formed at the tip of the rear end portion 13b, and the tip of the rear end portion 14b is electrically connected to the projected portion 13c by welding, soldering or the like. FIG. 6 shows a connecting portion in the conventional structure. A projected portion 110 is formed at the tip of a rear end portion 100 of an inner conductor segment, and another projected portion 210 is formed at the tip of a rear end portion 200 of an outer conductor segment. Both projected portions 110 and 210 are connected to each other as shown in FIG. 6, forming a crossing portion "A". In the connecting structure of the present invention, no such crossing portion is formed. Accordingly, the length of the conductor segments can be made somewhat shorter.

As shown in FIG. 1, the connecting portion 20 at the rear side and the connecting portion 20' at the front side are formed at positions equally distanced from the rotational center. The centrifugal force applied to the connecting portion 20 is equal to the centrifugal force applied to the connecting portion 20'. Therefore, no imbalance of the centrifugal force between the rear side and front side is generated. Rotational noises due to the imbalance can be avoided, and durability of the bearings 10, 11 can be improved.

Figure 7:
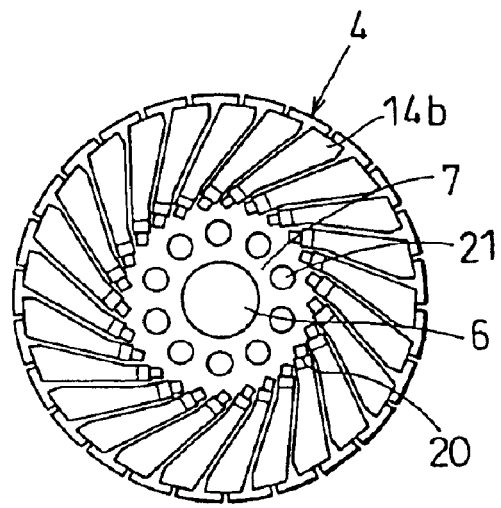
FIG. 7 is a plan view showing an armature having through-holes formed in an armature core, viewed from its axial rear end.
Figure 8:
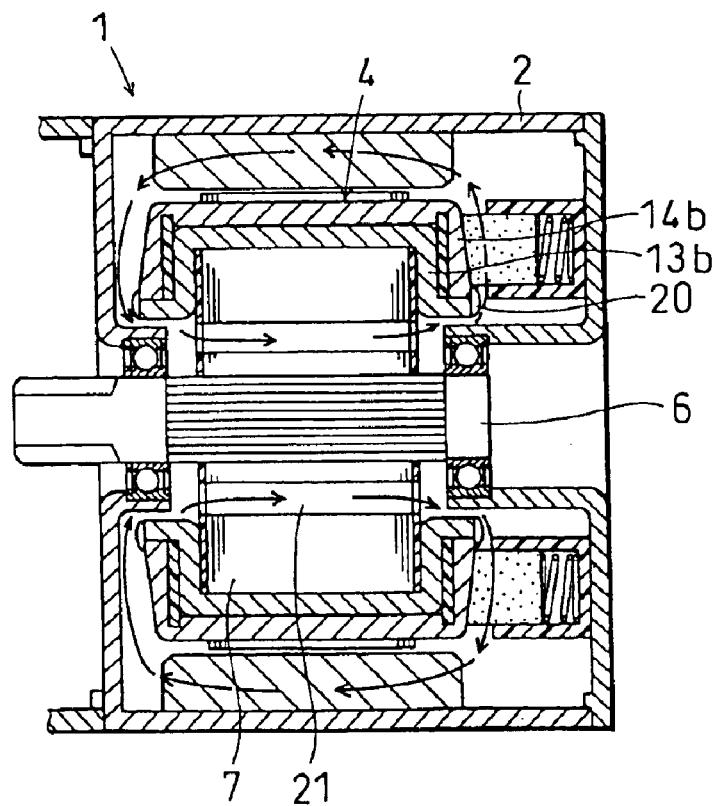
FIG. 8 is a cross-sectional view showing a starter motor having the armature shown in FIG. 7, cooling air passages being shown therein.

Plural through-holes 21 may be formed in the armature core 7 at a radial position inside the connecting portions 20, as shown in FIG. 7. The through-holes 21 are positioned at an equal interval. Air passages shown in FIG. 8 with arrows are formed through the through-holes 21. Heat generated in the armature 4 during operation of the rotary electric machine 1 is effectively exhausted through the air passages. A temperature rise in the armature 4 can be suppressed.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A rotor of a rotary electric machine, the rotor comprising:

a center shaft rotatably supported in a housing of the rotary electric machine;

a cylindrical armature core fixed to the center shaft, the armature core having a plurality of slots formed therein;

a plurality of inner conductor segments, each having an in-slot portion disposed in an inner portion of the slot, a rear end portion disposed at a rear side of the armature core, and a front end portion disposed at a front side of the armature core;

a plurality of outer conductor segments, each having an in-slot portion disposed in an outer portion of the slot, a rear end portion disposed at a rear side of the armature core, and a front end portion disposed at a front side of the armature core, wherein:

an armature coil is formed by electrically connecting the inner conductor segments and the outer conductor segments in a predetermined manner; and at least the rear end portion of the outer conductor segment extends in a direction substantially perpendicular to an axial direction of the center shaft and is formed so that an axial thickness of the rear end portion of the outer conductor segment gradually increases along the substantially perpendicular direction to the axial direction, thereby making a cross-sectional area of the rear end portion substantially uniform throughout its entire length.

2. The rotor of a rotary electric machine as in claim 1, wherein:

the rear end portions of the outer conductor segments form a commutator surface with which brushes disposed movably in the axial direction make sliding contact; and the commutator surface is slanted relative to a plane perpendicular to the axial direction.

3. The rotor of a rotary electric machine as in claim 1, wherein:

the rear end portions of the outer conductor segments form a commutator surface with which brushes disposed movably in the axial direction make sliding contact; and an insulator plate having a thickness compensating the gradually increasing thickness of the rear end portion of the outer conductor segment is interposed between the rear end portion of the inner conductor segment and the rear end portion of the outer conductor segment, so that the commutator surface becomes substantially perpendicular to the axial direction.

4. The rotor of a rotary electric machine as in claim 1, wherein:

the outer conductor segment is formed from a conductor wire having a rectangular cross-section; and the rear end portion is bent from the in-slot portion at a thin portion formed between the in-slot portion and the rear end portion.

5. The rotor of a rotary electric machine as in claim 1, wherein:

a plurality of through-holes extending in the axial direction for forming air passages are formed in the armature core, the through-holes being positioned at a radial inside of portions electrically connecting the inner conductor segments and the outer conductor segments.

6. The rotor of a rotary electric machine as in claim 1, wherein:

the rear end portion of the inner conductor segment includes a projected portion extending in the axial direction; and a tip of the rear end portion of the outer conductor segment is electrically connected to a side of the projected portion.

7. The rotor of a rotary electric machine as in claim 1, wherein:

the rear end portion of the inner conductor segment is electrically connected to the rear end portion of the outer conductor segment at respective tips thereof, forming a rear connecting portion, and the front end portion of the inner conductor segment is electrically connected to the front end portion of the outer conductor segment at respective tips thereof, forming a front connecting portion; and the rear connecting portion and the front connecting portion are positioned at an equal radial distance from the center shaft.

* * * * *